United States Patent
Elnozahy et al.

(12)
(10) Patent No.: US 6,701,421 B1
(45) Date of Patent: Mar. 2, 2004

(54) APPLICATION-LEVEL MEMORY AFFINITY CONTROL

(75) Inventors: Elmootazbellah Nabil Elnozahy, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/640,541

(22) Filed: Aug. 17, 2000

(51) Int. Cl.[7] .................................................. G06F 12/08
(52) U.S. Cl. ........................ 711/170; 711/203; 711/163
(58) Field of Search ................................. 711/170, 203, 711/163

(56) References Cited

U.S. PATENT DOCUMENTS 5,897,658 A * 4/1999 Eskesen et al. ............. 711/152

* cited by examiner

Primary Examiner—Reginald G. Bragdon
(74) Attorney, Agent, or Firm—Joseph P. Lally; Casimer K. Salys

(57) ABSTRACT

A method for allocating memory in a data processing system in which a configuration table indicative of the system's physical memory is generated following a boot event. The configuration table is then modified to identify a portion of the system's physical memory thereby hiding the remaining portion from the operating system. Subsequently, a memory allocation request is initiated by an application program. A device driver invoked by the application program then maps physical memory from the hidden portion to the application's virtual address space to satisfy the application request. The application program may be executing on a first node of a multi-node system in which each node is associated with its own local memory, In this embodiment, the node on which the allocated physical memory is located may be derived from the allocation request thereby facilitating application level, allocation of specified portions of physical memory.

23 Claims, 3 Drawing Sheets

APPLICATION-LEVEL MEMORY AFFINITY CONTROL

BACKGROUND

1. Field of the Present Invention

The present invention generally relates to the field of data processing systems and more particularly to a method and system for improving performance in a Non-Uniform Memory Architecture (NUMA) system.

2. History of Related Art

Symmetric Multiprocessing (SMP) architectures are widely used in the design of computing servers. SMP servers are characterized by multiple processors that communicate with a common system memory across a shared bus. The limited bandwidth of the shared bus constrains the number of processors that can be deployed economically in an SMP machine and suggests the use of alternative technologies for building massively scaleable servers. In addition, standard high-volume, bus-based SMP servers are beginning to appear on the market thereby making it economically attractive to construct larger systems out of multiple standard nodes without fundamentally re-engineering the component machines.

There are possible technologies for constructing scaleable server machines. One of these is the Cache-Coherent, Non-Uniform Memory (ccNUMA) architecture, in which a special memory controller and a high-speed interconnection switch connect several SMP-based servers, which are referred to as nodes. A processor in this architecture accesses the local memory within its SMP node through its shared memory bus and accesses the remote memory residing on others nodes through the high-speed interconnect. Thus, local memory accesses are faster than remote memory accesses. The special memory controller typically uses a directory structure to ensure that all processors see shared memory accesses in a consistent and coherent manner. The result is a shared-memory architecture that does not have the limitations of a single memory bus, yet maintains the familiar shared-memory programming model.

A ccNUMA system must run, without modification, all software written for SMP machines. Performance-sensitive software running in a ccNUMA system may, however, require special tuning because of the disparity in speed between accessing local and remote memory. It would be desirable if an application could minimize its accesses to remote memory. In addition, most legacy operating systems must be tuned to become aware of the remote memory resources and to manage them effectively. There is a need, therefore, for tools and techniques to realize the performance potential of ccNUMA architectures. Commercial operating systems, however, typically lack resources for enabling application programs to dedicate specified portions of physical memory for storing the application's data.

Performance degrades in a ccNUMA system if threads often stall waiting for the local cache to be loaded with data or instructions from remote memory or, alternatively, if the average memory latency incurred by programs increases due to remote accesses. Typically, a combination of hardware assist and operating system support is required to address the problems associated with frequent accesses to remote memory. Support at the operating system level is necessary so that a thread finds the data that it needs in nearby memory banks. Typically, this support requires non-trivial modification to several operating system modules such as memory management modules, process management, and I/O support. The resulting changes will typically be complex and increase the cost of maintaining the operating system. Furthermore, because there may be server design points in the hardware, it is difficult to modify the operating system and tune it to be highly effective for all possible design implementations.

For these reasons, the operating system supplier may be reluctant to add the necessary modifications to improve the performance of NUMA systems. If, for example, the operating system vendor strives to be portable across different machines, it may not find it economical or feasible to add specialized support for ccNUMA into the operating system kernel. On the other hand, a supplier of operating system technology that is tied to a preferred hardware platform may find it expensive to maintain different versions of the operating system, or to introduce NUMA support in the first place because of the heavy upfront investment required. It would therefore be highly desirable to implement a method by which a NUMA system running an off-the-shelf operating system supports a mechanism that permits application programs to control the physical memory space allocated for the application's data.

SUMMARY OF THE INVENTION

The problem identified above is addressed by a method and software for allocating memory in a data processing system. Initially, a configuration table indicative of the system's hardware resources including the system's physical memory is generated in response to a boot event. The generated configuration table is then modified to identify only a portion of the system's physical memory thereby reserving the remaining portion of physical memory such that operating system control of the reserved portion is prevented. Subsequently, a memory allocation request is initiated by an application program executing on the system. A device driver invoked by the application program then maps physical memory from the reserved portion to the applications virtual address allocated to satisfy the allocation request. Modifying the configuration table may include generating at least one space mapping entry in the configuration table. The space mapping entry parameter values may be derived from information in an initialization file stored on the system. The application program may be executing on a first node of a multi-node system in which each node is associated with its own local memory. In this embodiment, the node on which the allocated physical memory is located may be derived from the allocation request thereby facilitating application level, allocation of specified portions of physical memory.

BRIEF DESCRIPTION OF THE DRAWINGS

Other objects and advantages of the invention will become apparent upon reading the following detailed description and upon reference to the accompanying drawings in which.

Figure 1:
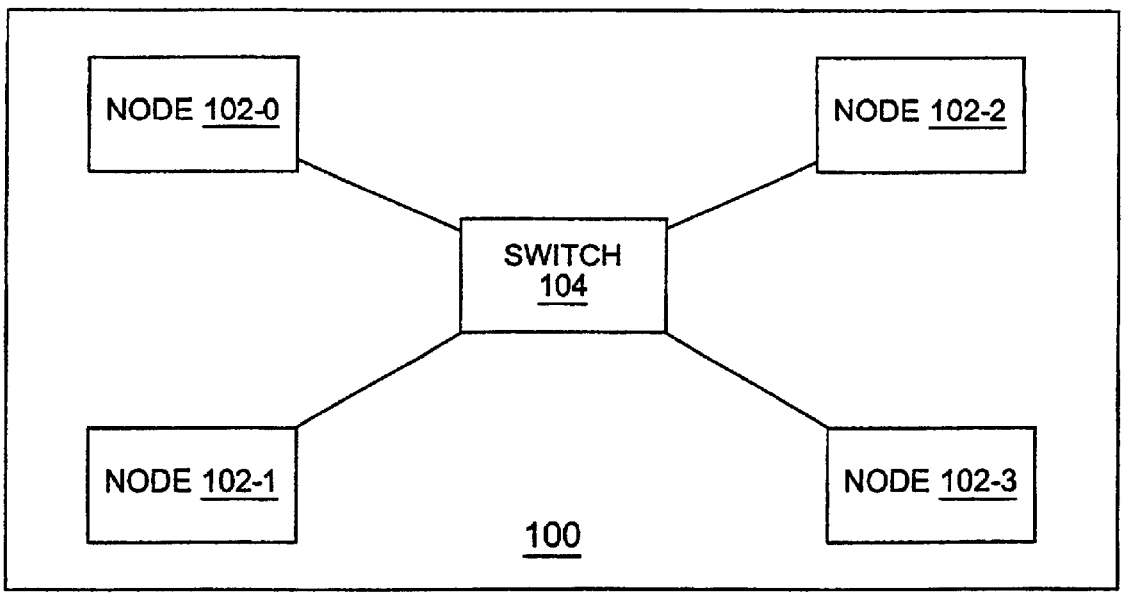
FIG. 1 is block diagram of an embodiment of a NUMA data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 2:
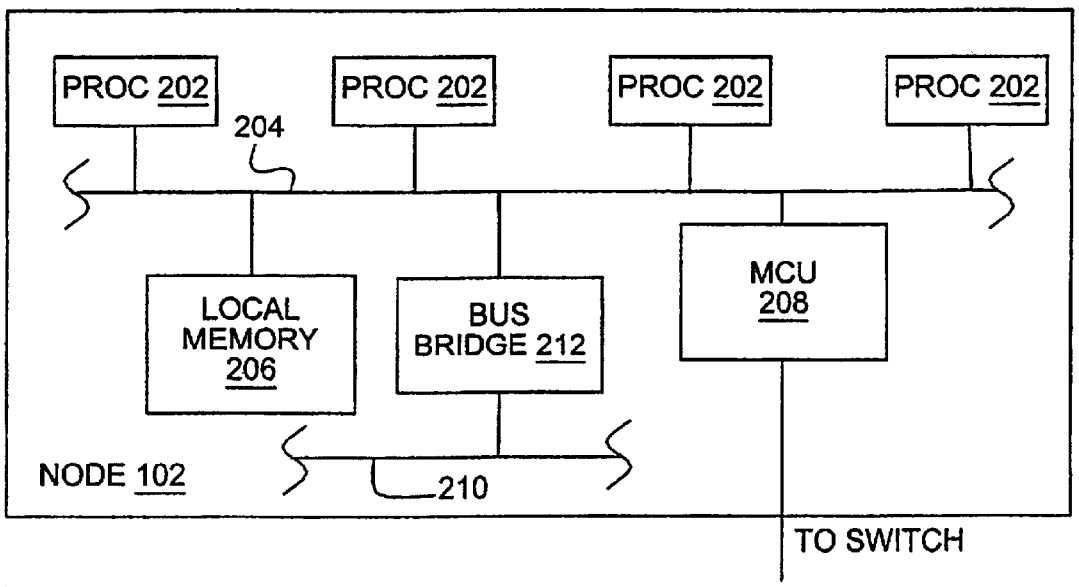
FIG. 2 is a block diagram of an embodiment of a node of the data processing system of FIG. 1.

Turning now to the drawings, FIGS. 1 and 2 illustrate one embodiment of a data processing system 100 suitable for using the memory affinity control facilities of the present invention. In the depicted embodiment system 100 is implemented as a NUMA system that includes a set of nodes 102-0, 102-1, 102-2, and 102-3 (generically or collectively referred to as node(s) 102) that are interconnected via a high-speed, cache-coherent switch 104. Each node 102 is typically configured as a symmetric multiprocessor system (SMP) in which two or more microprocessors 202 are connected to a system bus 204. A system memory 206 local to each node 102 is accessible to the processors 202 via system bus 204. Thus, the system memory 206 is substantially equidistant (i.e., equal access time) from each of the processors 202 within a node 102.

Each node 102 of system 100 may include a bus bridge 212 that connects system bus 204 to an IO bus 210 to provide support for any of a variety of IO device adapters (not depicted) including hard disk controllers, graphics adapter, high speed network adapters, and so forth. The IO bus 210 may comply with any of a variety of industry standard peripheral busses including, as examples, the PCI, ISA, EISA, and MCA peripheral busses. The PCI bus is detailed in the *PCI Local Bus Specification Rev.* 2.2, which is available from the PCI Special Interest Group, Hillsboro, Oreg., and incorporated by reference herein.

In one embodiment, each node 102 includes four processors 202, 1 GB of system memory 206, and a standard set of peripheral devices including keyboard, mouse, hard disk controller, graphics adapter, network adapter, and so forth. A mesh coherence unit (MCU) 208 is connected between system bus 204 and the switch 104. MCU 208 is typically responsible for snooping system bus 204 of node 102 and using a directory-based cache coherence protocol to extend memory coherence across nodes 102. In this arrangement, system 100 appears to the operating system and application level software as a 16-processor SMP system with 4 G bytes of system memory.

Figure 3:
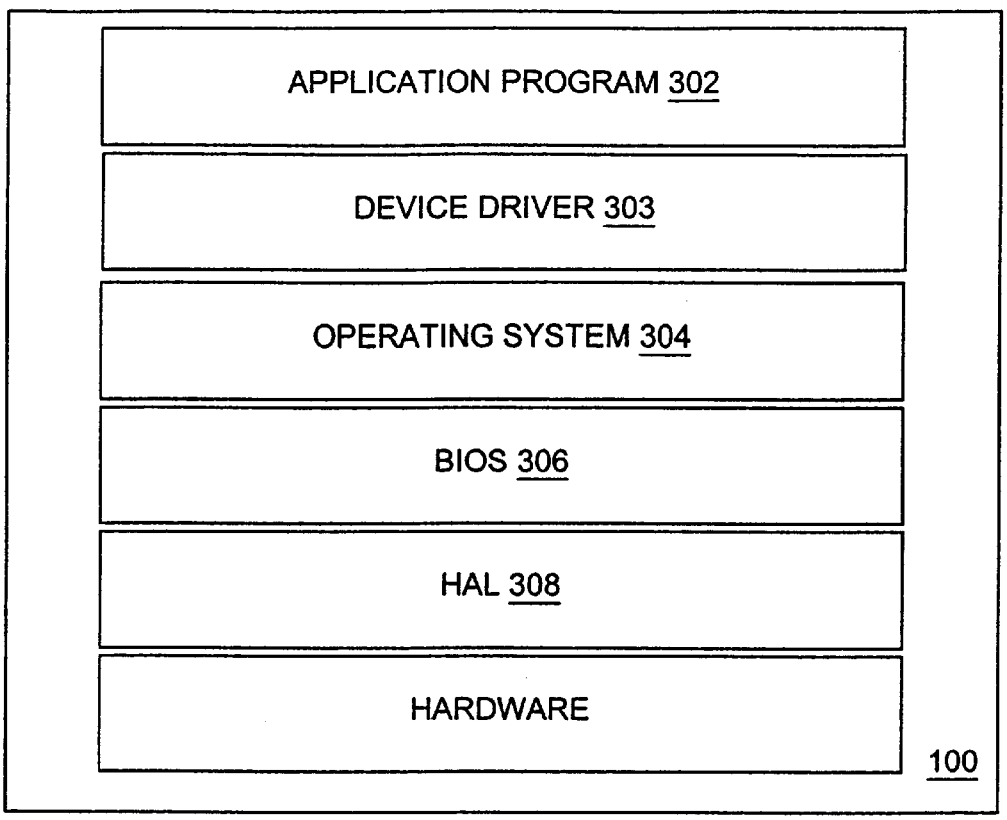
FIG. 3 is a conceptual representation of selected software components of a data processing system according to one embodiment of the present invention.

Portions of the present invention may be implemented as a sequence of computer instructions (computer software) that are encoded on a suitable storage device such as a hard disk, CD ROM, floppy diskette, magnetic tape, ROM, or system memory (RAM). Turning now to FIG. 3, a conceptualized illustration of selected components of software used in connection with data processing system 100 is presented. In the depicted embodiment, the software includes a hardware abstraction layer (HAL) 308, Basic Input Output System (BIOS) 306, an operating system 304, a MAPMEM device driver 303, and an application program 302. HAL 308 is a thin layer of software provided by the hardware manufacturer to hide variations in the underlying hardware from operating system 304. HAL 308 frees operating system vendors from developing an operating system that is specific to the hardware with which it communicates. HAL 308 provides routines that allow device drivers to support a device regardless of the hardware platform. HAL routines may be called from the kernel of operating system, or from a device driver such as MAPMEM device driver 303.

The BIOS 306 may be responsible for creating configuration tables that identify hardware components of system 100 including the size of the system memory. These configuration tables may comply with the multiprocessor specification (MPS) from Intel® Corporation. The MPS is described in *MultiProcessor Specification*, Version 1.4 (May 1999), which is incorporated by reference herein. The MPS defines, among other things, the format of an MP Configuration Table that may include one or more system address space mapping entries. Each MPS space mapping entry specifies a particular bus (such as system bus 204) and includes a beginning address value and an address length value that together define a range of system addresses that are permitted on the specified bus. If system bus 204 is the bus specified by a space mapping entry, the entry defines a range of system addresses that are available to or visible to operating system 304.

In one embodiment, HAL 308 modifies the BIOS generated system address space mapping entries in the MP Configuration Table to reserve a portion of the system's physical memory from the address space that is visible to operating system 304. Thus, the modified configuration tables identify a system address space that represents only a portion of the available physical memory. The modified tables are passed to memory management initialization code of operating system 304, which uses the tables to identify the physical address space available to the operating system. By identifying only a portion of the actual physical address space, the modified space mapping entries effectively "hide" a portion of the physical memory from operating system 304. The present invention contemplates using this hidden memory to provide a method by which an application program 302 can directly control the physical memory in which the application's data is stored. By providing applications with the ability to specify local memory as the destination for data storage, the invention enables high-performance operation on a ccNUMA system without modifying the operating system.

Figure 4:
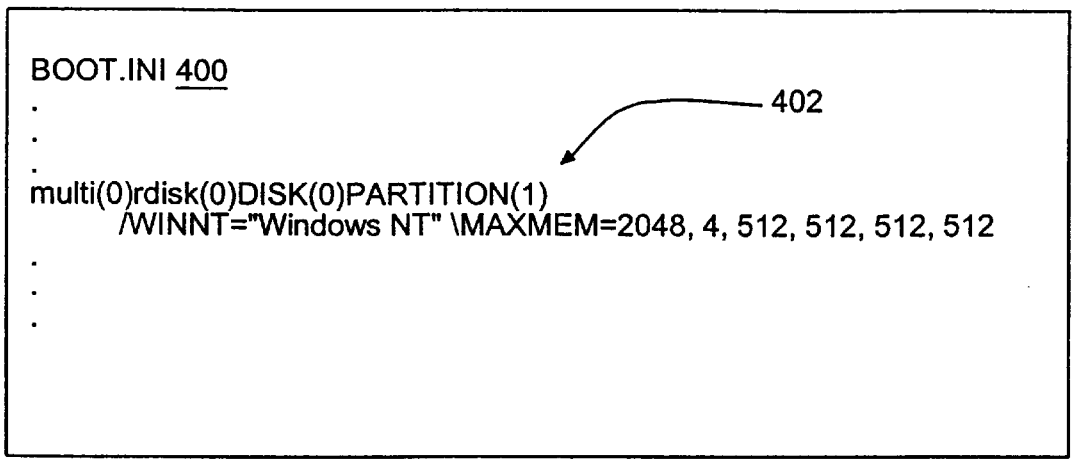
FIG. 4 illustrates selected portions of an initialization file suitable for use with one embodiment of the invention.

In an embodiment of the invention in which the operating system 304 is a Windows® NT® or other suitable Windows® filmily operating system from Microsoft, HAL 308 may be responsible for parsing various options specified in a boot.ini file of system 100. Referring to FIG. 4, a portion of a boot.ini file suitable for use with the present invention is depicted. In the depicted example, boot.ini file 400 includes a boot selection (BS) command 402 that identifies the root directory for system 100 to enable the system to complete the boot process by loading files that reside in the specified directory. In conjunction with the present invention, the BS command 402 includes a list of parameter values following the MAXMEM parameter option. In a conventional implementation, the MAXMEM statement includes just a single integer parameter that specifies that amount of physical memory that is available to the operating system 304. In a conventional implementation, the system address space visible to operating system 304 is a single contiguous address space that extends from physical address space 0 to physical address MAXMEM. In the depicted embodiment, however, a HAL 308 parses the MAXMEM options values to create modified space mapping entries in the system's configuration table.

The MAXMEM options according to one embodiment of the present invention may comprise a list of parameters including a value indicating the number of nodes on a multi-node system, and the amount of physical memory on each node that is to be mapped into the system address space. In the depicted example, the MAXMEM option on the BS statement 402 of boot.ini file 400 indicates that a total of 2048 MB is available to the operating system and that the 2048 MBytes are divided equally among four nodes. In one embodiment of the invention, HAL 308 modifies the BIOS generated system configuration tables to distribute the space mapping consistent with the parameter list specified in boot.ini file 400. BS statement 402 as depicted in FIG. 4 identifies to HAL 308 that the system 100 includes a total of four nodes and that 512 MB of physical memory visible to the operating system is located on each of the nodes. In this embodiment, the HAL 308 may modify the system configuration tables to map 512 MB, of physical memory from each node into the system address space.

Figure 5:
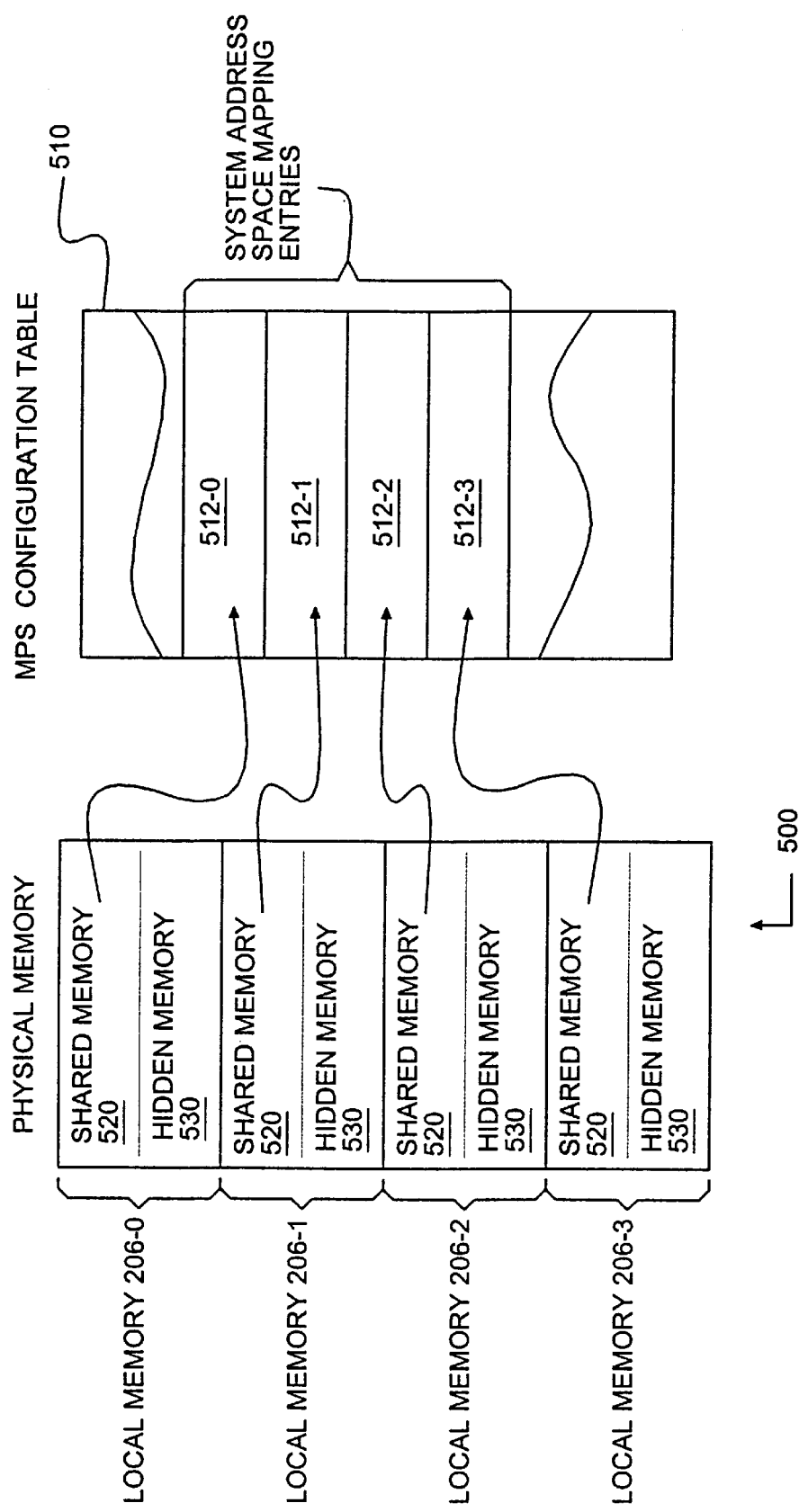
FIG. 5 illustrates a mapping of physical memory to operating system accessible system address space according to one embodiment of the invention.

Referring now to FIG. 5, the space mapping suggested by BS statement 402 of the illustrated example of boot.ini 400 is represented. In this illustration, the physical memory 500 of data processing system 100 is represented on the left and an MPS compliant configuration table 510 is indicated on the right. The physical memory 500 includes the local memory 206 from each of the nodes. Thus, local memory 206 from first node 102-0 is represented in FIG. 5 by reference numeral 206-0, local memory 206 from second node 102-1 is represented by reference numeral 206-1, and so forth. In the illustrated example, HAL 308, interprets the BS statement 402 in boot.ini file 400 and modifies the MPS configuration table 510 by creating a set of system address space mapping entries 512-0, 512-1, 512-2, and 512-3 (generically or collectively referred as space mapping entry (ies) 512). Each space mapping entry 512 maps a 512 MB block of physical memory 500 from each node 102 into the system address space. In this embodiment, the system address space that is visible to operating system 304 includes 512 MB of memory from each of the four nodes 102. If each node 206 includes 1 GB of physical memory, it will be appreciated that 512 MB of physical memory from each node is hidden from the operating system. (The hidden memory in each node 102 is represented in FIG. 5 by the reference numeral 530 while the non-hidden or shared memory is identified by reference numeral 520). By varying the option parameter values in the BS statement 402 of the boot.ini file 400, the user can customize the amount of shared and hidden memory on each of the nodes 102 of system 100.

The hidden memory portions 530 of each local memory 206 are invisible to the kernel of operating system 304. Consequently, kernel data structures, as well as all application memory are placed only in the shared portions 520 of physical memory. Moreover, hidden memory is not subject to operating system initiated re-mapping. In one embodiment, the invention employs MAPMEM device driver 303 (FIG. 3) to manage and access the hidden portions 530 of local memory 206. MAPMEM device driver 303 may initially query HAL 308 to determine the actual amount of physical memory in system 100. Subsequently, MAPMEM device driver 303 manages hidden memory portions 530 of system 100 as though it were a memory-mapped device. Typically, commercially available operating systems such as Windows NT® include support routines that directly map device (IO) physical memory to an application's virtual memory space to enable fast data transfers. MAPMEM device driver 303 according to one embodiment of the invention capitalizes on such facilities to control the allocation of hidden memory 530.

An application program 302 may include a direct call to the MAPMEM device driver 303 using an IOCTL command or, alternatively, may include a user level library command (referred to herein as NUMALLOC) that invokes MAPMEM device driver 303. MAPMEM device driver 303 can typically access kernel entry points of operating system 304 to determine the identify of a thread that initiated a request for allocation of hidden memory. In one embodiment, MAPMEM device driver 303 requires a first value indicating the node on which the requested memory is to be allocated and a second value indicating the amount of memory requested. The MAPMEM device driver 303 is typically responsible for determining the physical addresses on the requested node that are to be allocated to the requester. After determining an appropriate physical address range for the allocation request, MAPMEM device driver 303 may map the determined physical address range into an application's virtual address space through a suitable mapping function such as a MmMaploSpace kernel call in Windows NT®. Operating systems typically provide such functions to enable applications to directly map device (10) space into their virtual address space to enable fast data transfers. Thus, the current invention may utilize existing functionality provided by the operating system to provide applications with customized memory allocations. When the allocated memory is no longer needed, device driver 303 may depend upon the application 302 to inform it when the mapped memory is no longer needed. Alternatively, driver 303 can use a PsSetCreateProcessNotifyRoutine or other comparable function to force operating system 304 to inform device driver 303 when the thread for which the memory was allocated terminates.

Device driver 303 provides application 302 with direct control over where data is placed in physical memory. Application 302 itself, or a user level library function that provides a shell for device driver 303, can allocate specific physical memory to create affinity between a thread and its data structures. Combined with existing ability to bind a thread a specific processor or processors, the ability to allocate memory for a thread enables the application developer to ensure that a thread executes on a particular node 102 and that the memory used by the thread is local to the node. This allocated memory is not subject to paging or movement since the operating system allocated memory is from the hidden memory 530 that is invisible to operating system 304. Accordingly, the application program is not subject to a "wake-up" process after a period of inactivity.

The allocation of hidden memory as described herein may be performed according to a memory allocation policy. The memory allocation policy may be globally defined or specified by the application program developer directly. The memory allocation policy informs the system of the manner in which the memory is to be allocated. In a local memory allocation policy, for example, a memory allocation request will result in allocate memory to the hidden memory that is local to the node on which the thread requesting the allocation is executing. A local memory allocation policy is suitable for allocating memory that will be used predominantly by the thread that initiated the allocation request. If a memory allocation request is initiated for memory that will be used fairly equally by a number of threads that may reside on various nodes, a striped memory allocation policy might be most suitable. In a striped allocation policy, blocks of address space are allocated among the nodes in a rotating manner such that a portion of an approximately equal portion of the allocated memory resides on each of the nodes. A striped policy might allocate, for example, each consecutive page of memory space to a different node in the system in round robin fashion. In addition, the size of each stripe (the stride) may be varied by user specification such that, for example, blocks of memory 4 pages in size are allocated among the nodes.

In one embodiment, global specification of the memory policy might be used to impose memory allocation affinity on software written for an SMP system. If, for example, existing software allocates memory using conventional MALLOC library calls, one implementation of the invention might convert all MALLOCs to NUMALLOCS that are executed according to the globally specified allocation policy. Alternatively, an application programmer may actively control the memory affinity policy by including NUMALLOCs (or direct MAPMEM device driver calls) in the source code.

It will be apparent to those skilled in the art having the benefit of this disclosure that the present invention contemplates improved NUMA performance with a non-NUMA aware operating system by enabling applications to allocate specified portions of physical memory. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   at least one processor and a physical memory accessible to the processor;
   hardware abstraction level (HAL) code configured to hide a portion of the physical memory from tie operating system to prevent operating system access to the hidden portion; and
   device driver code configured to map physical memory from the hidden portion of physical memory to the virtual address space of an application program in response to a memory allocation request from the application program.

2. The system of claim 1, wherein the HAL code is configured to hide a portion of the physical memory by modifying a configuration table generated by the BIOS when the system is booted.

3. The system of claim 2, wherein the HAL code is configured to modify the configuration table by generating at least one space mapping entry in the configuration table.

4. The system of claim 3, wherein HAL code is configured to determine the parameters of the space mapping entry from information in an initialization file stored on the system.

5. The system of claim 1, wherein the system comprises a plurality of nodes, each node being associated with a corresponding local portion of the physical memory, and further wherein the device driver is configured to map the physical memory by:
   selecting one of the plurality of local memory portions based on a determination of the node on which the allocation requester is executing; and
   mapping the physical memory from the selected local memory portion.

6. The system of claim 5, wherein the application programs specifies the node associated with the local memory portion from which the physical memory is to be mapped and the amount of memory requested.

7. The system of claim 5, wherein the device driver is configured to select a local portion of the physical memory that resides on the node on which the application program is executing.

8. The system of claim 1, wherein the system comprises a plurality of nodes, each node being associated with a corresponding local portion of the physical memory, and further wherein the mapping of physical memory includes mapping portions of each of the local memory portions.

9. A method of allocating physical memory in a data processing system comprising a plurality of nodes, each node being associated with a corresponding local portion of the physical memory, comprising:
   hiding a portion of the system's physical memory from the operating system to prevent operating system access to the hidden portion;
   initiating a memory allocation request;
   selecting one of the plurality of local memory portions based on a determination of the node on which the memory allocation request is executing; and
   mapping physical memory from the hidden portion of the selected local memory portion to the virtual address space of the requester to satisfy the allocation request.

10. The method of claim 9, wherein hiding a portion of the physical memory includes modifying a configuration table generated when the system is booted.

11. The method of claim 10, wherein modifying the configuration table includes generating at least one space mapping entry in the configuration table.

12. The method of claim 11, wherein the parameters of the space mapping entry are derived from information in an initialization file stored on the system.

13. The method of claim 9, wherein initiating the allocation request includes specifying the node associated with the local memory portion from which the physical memory is to be mapped and specifying the amount of memory requested.

14. The method of claim 9, wherein the selected local portion resides on the node on which the allocation requester is executing.

15. The method of claim 9, wherein the data processing system comprises a plurality of nodes, each node being associated with a corresponding local portion of the physical memory, and further wherein the mapping of physical memory includes mapping portions of each of the local memory portions.

16. A computer program product comprising a sequence of microprocessor executable instructions configured on a storage medium, the instructions including:
   hardware abstraction level (HAL) code configured to hide a portion of the physical memory from the operating system to prevent operating system access to the hidden portion; and
   device driver code configured to map physical memory from the hidden portion of physical memory to the virtual address space of an application program in response to a memory allocation request from the application program.

17. The computer program product of claim 16, wherein the HAL code is configured to hide a portion of the physical memory by modifying a configuration table generated by the BIOS when the system is booted.

18. The computer program product of claim 17, wherein the HAL code is configured to modify the configuration table by generating at least one space mapping entry in the configuration table.

19. The computer program product of claim 18, wherein HAL code is configured to determine the parameters of the space mapping entry from information in an initialization file stored on the system.

20. The computer program product of claim 16, wherein the system comprises a plurality of nodes, each node being associated with a corresponding local portion of the physical memory, and further wherein the device driver is configured to map the physical memory by:

selecting one of the plurality of local memory portions based on a determination of the node on which the allocation requester is executing; and mapping the physical memory from the selected local memory portion.

21. The computer program product of claim 20, wherein the application programs specifies the node associated with the local memory portion from which the physical memory is to be mapped and the amount of memory requested.

22. The computer program product of claim 20, wherein the device driver is configured to select a local portion of the physical memory that resides on the node on which the application program is executing.

23. The computer program product of claim 16, wherein the system comprises a plurality of nodes, each node being associated with a corresponding local portion of the physical memory, and further wherein the mapping of physical memory includes mapping portions of each of the local memory portions.

* * * * *

UNITED STATES PATENT AND TRADEMARK OFFICE
CERTIFICATE OF CORRECTION

| | |
|---|---|
| PATENT NO. | : 6,701,421 B1 |
| DATED | : March 2, 2004 |
| INVENTOR(S) | : Elmootazbellah Nabil Elnozahy and Ramakrishnan Rajamony |

It is certified that error appears in the above-identified patent and that said Letters Patent is hereby corrected as shown below:

Column 7,
Line 27, Claim 1, should read as follows:
1 (orginial). A data processing system, comprising:

at least one processor and a physical memory accessible to the processor;

hardware abstraction level (HAL) code configured to hide a portion of the physical memory from the operating system to prevent operating system access to the hidden portion; and
device driver code configured to map physical memory from the hidden portion of physical memory to the virtual address space of an application program in response to a memory allocation request from the application program.

Signed and Sealed this

Twenty-eighth Day of December, 2004

JON W. DUDAS
*Director of the United States Patent and Trademark Office*